(12) United States Patent
Schisler et al.

(10) Patent No.: US 6,264,178 B1
(45) Date of Patent: Jul. 24, 2001

(54) MOLDED AIR SLEEVES

(75) Inventors: Robert Charles Schisler, Munroe Falls; James Edwin Woodlee, Kent; Jeffrey Mark Frye, Uniontown, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/592,247

(22) Filed: Jun. 13, 2000

(51) Int. Cl.[7] ............................................. F16F 9/04
(52) U.S. Cl. ............................. 267/64.27; 267/64.24
(58) Field of Search ........................... 267/35, 148, 149, 267/64.11, 64.24, 64.27; 152/526, 535, 538, 361

(56) References Cited

U.S. PATENT DOCUMENTS

| | | | |
|---|---|---|---|
| 2,922,637 | 1/1960 | Bowser et al. | 267/65 |
| 3,794,538 | 2/1974 | Christie et al. | 156/187 |
| 4,673,168 | 6/1987 | Warmuth et al. | 267/64.27 |
| 4,762,308 | 8/1988 | Geno | 267/64.27 |
| 4,763,883 | 8/1988 | Crabtree | 267/64.27 |
| 4,784,376 | 11/1988 | Ecktman | 267/64.27 |
| 4,844,429 | 7/1989 | Ecktman | 267/64.24 |
| 5,201,499 | 4/1993 | Elliott et al. | 267/64.27 |
| 5,566,929 | 10/1996 | Thurow | 267/64.24 |
| 5,580,033 | 12/1996 | Burkley et al. | 267/64.27 |
| 5,954,316 | 9/1999 | Voss | 267/64.27 |

*Primary Examiner*—Christopher P. Schwartz
(74) *Attorney, Agent, or Firm*—Nancy T. Krawczyk

(57) ABSTRACT

The present invention is an air sleeve that has a tubular shape with opposing sleeve ends. At least one reinforcing ply extends from one sleeve end to the opposing sleeve end; the reinforcing ply has cords encapsulated in a ply coat compound and at least one end of the reinforcing ply terminates in one air sleeve end. According to the present invention, a reinforcement means is spaced from the end of the reinforcing ply by a distance greater than the ply coat compound.

12 Claims, 5 Drawing Sheets

MOLDED AIR SLEEVES

FIELD OF THE INVENTION

The present invention relates to molded air sleeves. More particularly, the present invention relates to a method of construction and manufacturing of molded air sleeves to achieve a desired construction at the end of the air sleeve.

BACKGROUND OF THE INVENTION

Air sleeves have a rubber innerliner, two plies of cord fabric, and a rubber cover. These sleeves see their greatest commercial usage in the automotive helper spring market by being mounted as air springs on shock absorbers and struts. Other uses include truck cab suspension springs, truck driver seat springs, automobile air springs, and a variety of industrial air springs.

The air sleeves are manufactured with a variety of ends, but these ends fall into two basic constructions: those with the ending of the cord plies exposed to the air (usually a cut end), and those where the endings of the cord plies must be completely encased in rubber, called a 'sealed end'. For sealed end sleeves, enclosing the cord endings in rubber is very important if the end of the sleeve is exposed to the high pressure air chamber of the air spring, where exposed cord ply ends may lead to sleeve failure due to high pressure air entering the exposed cord endings and migrating into the body of the air sleeve.

Another common requirement for air sleeves is that the cord ply endings be within 0.20" or less (5.1 mm or less) of the sealed end of the part. This requirement relates to the air shock manufacturer's need to avoid excess material beyond the end of the crimp fastener, the need to crimp very near the end of the part, and the need to have a good crimp which requires the cord plies to end very near the end of the sleeve.

However, in manufacturing air sleeves with sealed ends, several issues may arise. First, some sealed end air sleeves require not only that the cord endings be placed within 0.20" or less (5.1 mm or less) of the end of the part, but also require a chamfered angle on the end of the part of typically 30° to 60°, which reduces the thickness of the end of the part by up to 50%. The combined requirement for cords to be adjacent to the end and the chamfered shape can make it very difficult to reliably seal the cord endings during the molding process because of the loss of covering rubber due to the chamfer.

Secondly, if the molding process uses an inflatable bladder on one side of the part and a metal mold on the other side of the part, significant movement of the end areas of the air sleeve as the bladder inflates can occur. This can lead to the cord endings drifting toward one surface of the part, while the elastomer is soft and flowing. This may result in unreliable sealing of the cord endings.

Thirdly, some air sleeve must be provided with a firm or stiff end to the part. This goal may be difficult to achieve if a sealed end, or a sealed and chamfered end is also required. The lack of cords extending completely to the end of the part reduces the stiffness, and chamfering significantly reduces stiffness.

SUMMARY OF THE INVENTION

The present invention is directed towards an air sleeve. The air sleeve has a tubular shape with opposing sleeve ends. At least one reinforcing ply extends from one sleeve end to the opposing sleeve end; the reinforcing ply has cords encapsulated in a ply coat compound and at least one end of the reinforcing ply terminates in one air sleeve end. According to the present invention, a reinforcement means is spaced from the end of the reinforcing ply by a distance greater than the ply coat compound.

The reinforcement means is selected from the group consisting of fiber loaded elastomer, woven fabric ply, knitted fabric ply, spun-bonded ply, and cord reinforced ply. When the reinforcement means is a fiber loaded rubber, the elastomer is comprised of 1.5 to 6 phr (parts per hundred rubber) of chopped fibers. The fibers have a nominal length of about $\frac{1}{16}$inch to $\frac{1}{4}$inch (1.5 mm to 6.5 mm).

In another aspect of the disclosed invention, both opposing ends of the air sleeve are provided with the reinforcement means.

Also disclosed in the present invention is a method of forming an air sleeve to achieve the desired air sleeve described above.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
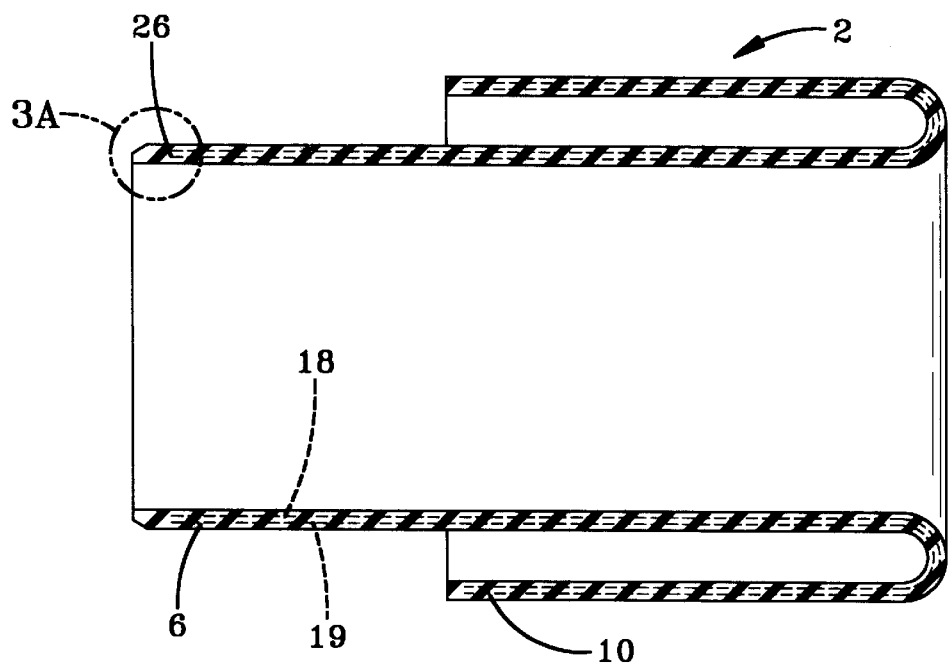
FIG. 1 illustrates a molded air sleeve with the end flipped and ready to be mounted in a strut/shock.
Figure 2:
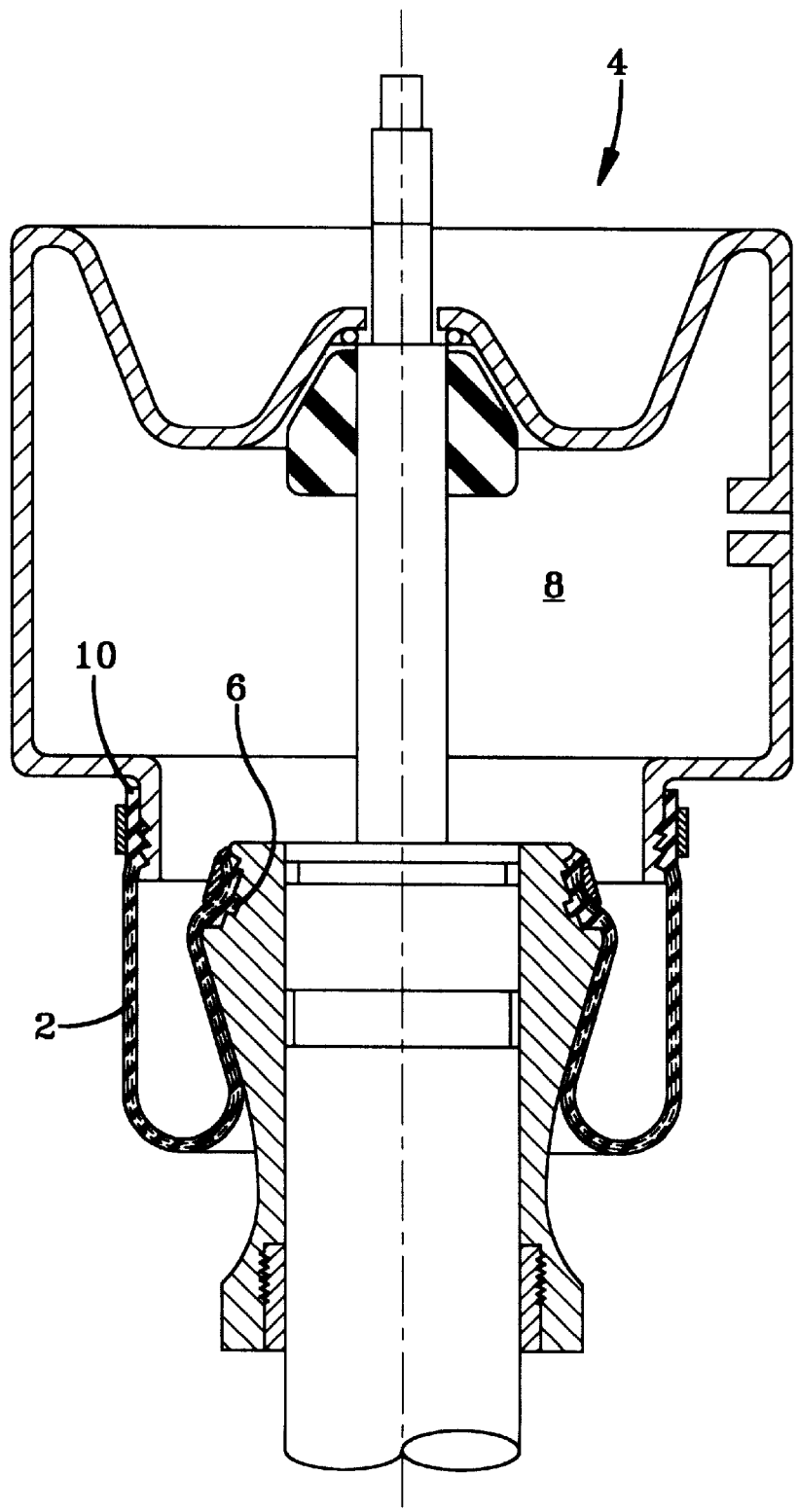
FIG. 2 illustrates a pneumatic suspension strut with an air sleeve.

FIG. 1 illustrates an air sleeve 2 of the type to be used in a pneumatic shock absorber or strut. The sleeve 2 is positioned with one sleeve end 10 flipped up, the sleeve 2 being ready to be mounted in a strut or shock absorber. When the sleeve 2 is employed in a suspension strut 4, one sleeve end 6 is restrained within the pressure chamber 8 created within the shock absorber 4, while the other sleeve end 10 is restrained outside of the pressure chamber 8, as illustrated in FIG. 2. Conventionally, the sleeve end 10 restrained outside of the pressure chamber 8 is a cut end, while the sleeve end 6 restrained inside the chamber 8 is a sealed end.

Figure 3A:
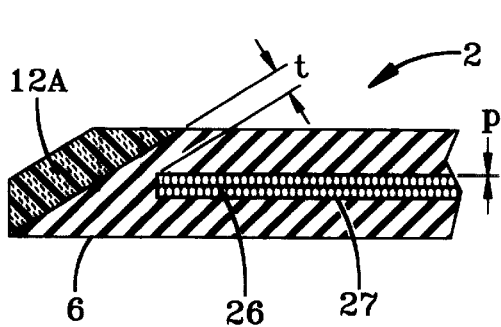
FIGS. 3A–3C illustrates different embodiments of the inventive air sleeve end.
Figure 3B:
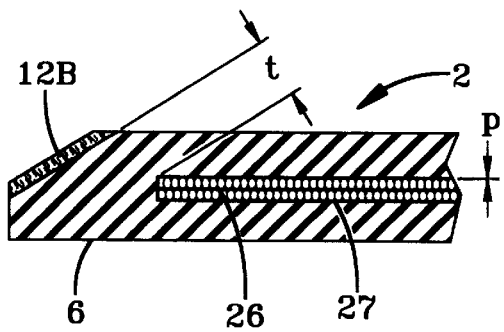
Figure 3C:
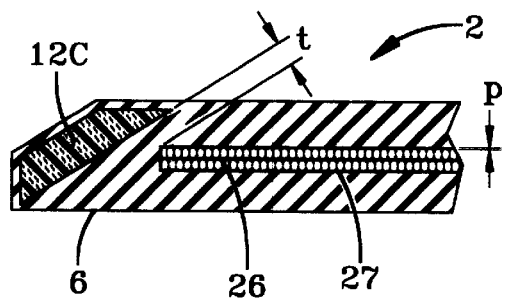

In accordance with the present invention, the sealed end 6 of the air sleeve 2 is formed with an additional reinforcement layer 12, see FIGS. 3A to 3C. The reinforcement layer 12A, 12B, 12C is located at the sleeve end, and is distanced from the end 26 of the reinforcing plies 18, 19 by a distance t. The distance t is measured as the smallest distance between the reinforcement layer 12 and the end 26 of the reinforcement plies 18, 19. The distance t is greater than the thickness P of the ply coat covering the cords 27 of the reinforcing plies 18, 19. The reinforcement layer 12 may be placed in variety of locations in the sealed end 6 of the sleeve 2, and the exact location and configuration of the reinforcement layer 12 is not limited by the few specific illustrations. The additional reinforcement layer 12 aids in the manufacture of the air sleeve 2 and ensures the desired configuration of the sleeve end 6, as well as provides additional strengthening at the sleeve end 6.

With respect to the few specific illustrations of the inventive air sleeve 2 and inventive air sleeve end 6, the following descriptions are provided. In FIG. 3A, the reinforcement layer 12A is a relatively thick fiber loaded rubber layer that is distanced from the reinforcing plies by a distance t that is approximately one-half the thickness of the reinforcing layer 12A. In FIG. 3B, the reinforcement layer 12B is a thin cord reinforced layer. The reinforcement layer 12B is located along the surface of the sleeve end 6. In FIG. 3C, the reinforcement layer 12C is a fiber loaded rubber layer that is encompassed within the sleeve end 6. As evident from these specific illustrations of the inventive air sleeve, the reinforcement layer 12 may be constructed from different materials, and may be placed in a variety of configurations in the sleeve end other than just the specific illustrated examples. Other configurations can also include wrapping the entire end 6 of the sleeve 2 (i.e. U-shaped wrapping to cover the end) and having the reinforcement layer 12 extend along only one side of the sleeve.

Figure 4:
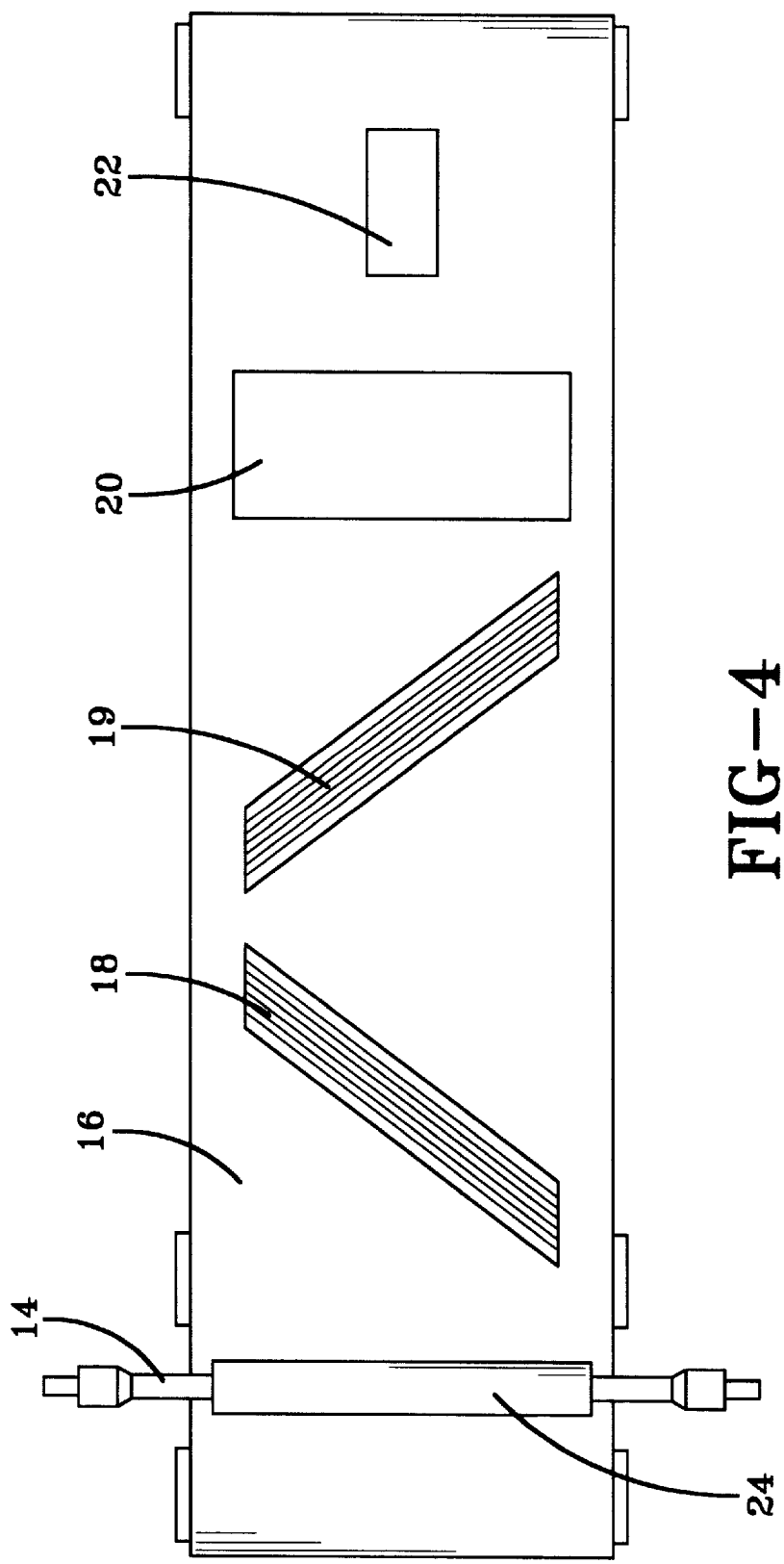
FIG. 4 illustrates a method of assembling an airsleeve in accordance with the invention.

The first step in manufacturing the flexible shaped air sleeves 2 is the building of an uncured tubular preform. Any efficient method for plying up the layers of the tubular preform is suitable. A preferred automated method is disclosed in U.S. Pat. No. 3,794,538, and is illustrated in FIG. 4. In the illustrated method, two sleeves are simultaneously prepared on a rotatable mandrel 14, the length of the mandrel being greater than twice the length of the airsleeve 2 being prepared. The individual components of the airsleeve 2 are laid upon a moving belt 16 that facilitates material handling during the sleeve buildup. Correspondingly, the components laid upon the belt 16 are also of a length twice the necessary length of a single airsleeve 2 being prepared. The conventional components laid upon the belt 16 are at least one reinforcement ply 18, 19 and a cover layer 20. Adjacent to the cover layer 20 is the reinforcement layer 12, centrally located on the moving belt 16. The width of the reinforcement layer 12 is twice the width required for each end of the airsleeve 2 to be manufactured.

In building the preform, the innermost rubber layer 24 is extruded in a separate operation, slightly expanded and slipped over the rotatable mandrel 14. The first ply 18 is spirally applied to the mandrel 14, overlying the innermost rubber layer 24 by means of the rotating mandrel 14 and the moving belt 16. The second ply 19 is spirally wound in an opposite sense over the first fabric layer 18. The fabric plies 18, 19 contain bias cut cords that have their cords running in opposite directions. The cords of the plies 18, 19 are encapsulated in a ply coat compound to form the plies 18, 19. It is understood that the tubular preform may be comprised of any of a large variety of textile cords, or even fabrics if desired, and that the particular bias angles of the cords in the plies 18, 19 are determined by the type of air sleeve 2 being manufactured. The cover layer 20 of calendered rubber is applied over the underlying layers 24, 18, 19. Finally, the reinforcement layer 22 is wound centrally onto the cover layer 20. Following assembly on the rotatable mandrel 14, the preform is removed from the mandrel 14 and the preform is cut in half to form two separate preforms.

After the preform is cut in half, one preform end has the additional reinforcement layer 22 while the opposing preform end does not. While not illustrated, both preform ends may be provided with the additional reinforcement layer 22. For such a construction, additional reinforcement layers 22 may be laid upon the moving belt 16 adjacent to the central reinforcement layer 22, or may be applied in any other reasonable method. After the preform has been assembled and cut to the proper length, with the reinforcement layer 22 located at least one of the preform ends, the preform is cured to form the air sleeve 2.

Alternative methods of constructing the preform include, but are not limited to, plying up the materials required to manufacture only one sleeve, applying the reinforcement layer 22 to the rotatable mandrel 14 before the innermost rubber layer 24 is applied to the mandrel 14, or applying the reinforcement layers 22 only at the ends of the double length preform.

The reinforcement layer may be provided from a plurality of different types of materials. As shown in FIGS. 3A and 3C the reinforcement layer 12A, 12C is a fiber-reinforced elastomer. The elastomeric base is selected from among elastomers conventionally used in manufacturing air sleeves, included, but not limited to elastomers such as polychloroprene, poly-epichlorohydrin, polyisobutylene, halogenated-polyisobutylene, natural rubber, polyisoprene, polybutadiene, styrene-butadiene, and blends of such elastomers. Any elastomer that adheres well to the cover layer 20 will be satisfactory for the elastomer base of the reinforcement layer 12A, 12C. Preferably, the elastomer base is from the same family as the elastomer used to form the cover layer 20 so that the reinforcement layer 12A, 12C will readily bond with the cover layer 20 upon curing of the preform to form the sleeve 2. The elastomer is provided with about 1.0 to 10 phr of fiber, preferably 1.5 to 6.0 phr, with a preferred loading of 6.0 phr. The fibers are short fibers, with a nominal length ranging from about $\frac{1}{16}$inch to about $\frac{1}{4}$inch (1.5 mm to 6.5 mm), with a preferred length of about $\frac{3}{16}$inch (4.75 mm). The fibers may or may not be oriented in the reinforcement layer 12A, 12C. The fibers are of any conventional reinforcing fiber material, such as cotton, nylon, rayon polyester, aramid, glass, metal, steel, or carbon.

As illustrated in FIG. 3B, the reinforcement layer 12B may also be formed from a fabric or cord layer. If the reinforcement layer 12B is a fabric layer, it may be woven, knitted, or spun bonded from materials such as rayon, nylon, polyester, aramid, or cotton, or a combination of such materials. Preferably, the fabric has a thin gauge. Or the reinforcement layer 12B may be a calendered cord layer formed from the same materials as a fabric layer. An adhesive layer may be applied in the conventional manner to the reinforcement layer 12B so that the layer 12B will adhere to any coating rubber, or the rubber of the air sleeve 2.

Some curing/molding processes use an inflatable bladder on one side of the sleeve preform and a metal mold on the other side of the sleeve. The preform is cured using an inflatable bladder and a metal mold. The preform is placed over the inflatable bladder and then placed within the metal mold. Or, the preform is placed over the exterior of a metal mold and then placed within a compressively inflatable bladder. The metal mold is contoured to provide a desired configuration of the sleeve 2 and sleeve ends 6, 10 upon curing to form the sleeve 2. The inflatable bladder presses the preform against the contoured metal mold and into the contoured areas of the mold that form the sleeve ends 6, 10. As the bladder inflates, because of the reinforcement layer 12 very limited to no flow of the elastomers at the airsleeve end 6 occurs.

The fiber within the reinforcement layer 12, whether the chopped fibers of the fiber loaded elastomer 12A, 12C or the fibers with the fabric or cord layer 12B, provides the reinforcement layer 12 with a greater resistance to flow than the flow characteristics of a non-fiber reinforced elastomer of the innermost rubber layer 24 or the cover layer 20. When the sleeve 2 is cured, the reinforcement layer 12 maintains its location at the sleeve end 6, and the sleeve end 6 maintains the desired shape and any movement of the cord ends 26 is substantially reduced.

The reinforcement layer 12 also provides greater strength and stiffness to the sleeve end 6. If the sleeve end 6 is molded to form a tapered end, the reinforcement layer 12 increases the stiffness of the tapered sleeve end 6, as well as assists in maintaining the tapered shaped of the sleeve end 6 during molding of the sleeve 2.

Figure 5:
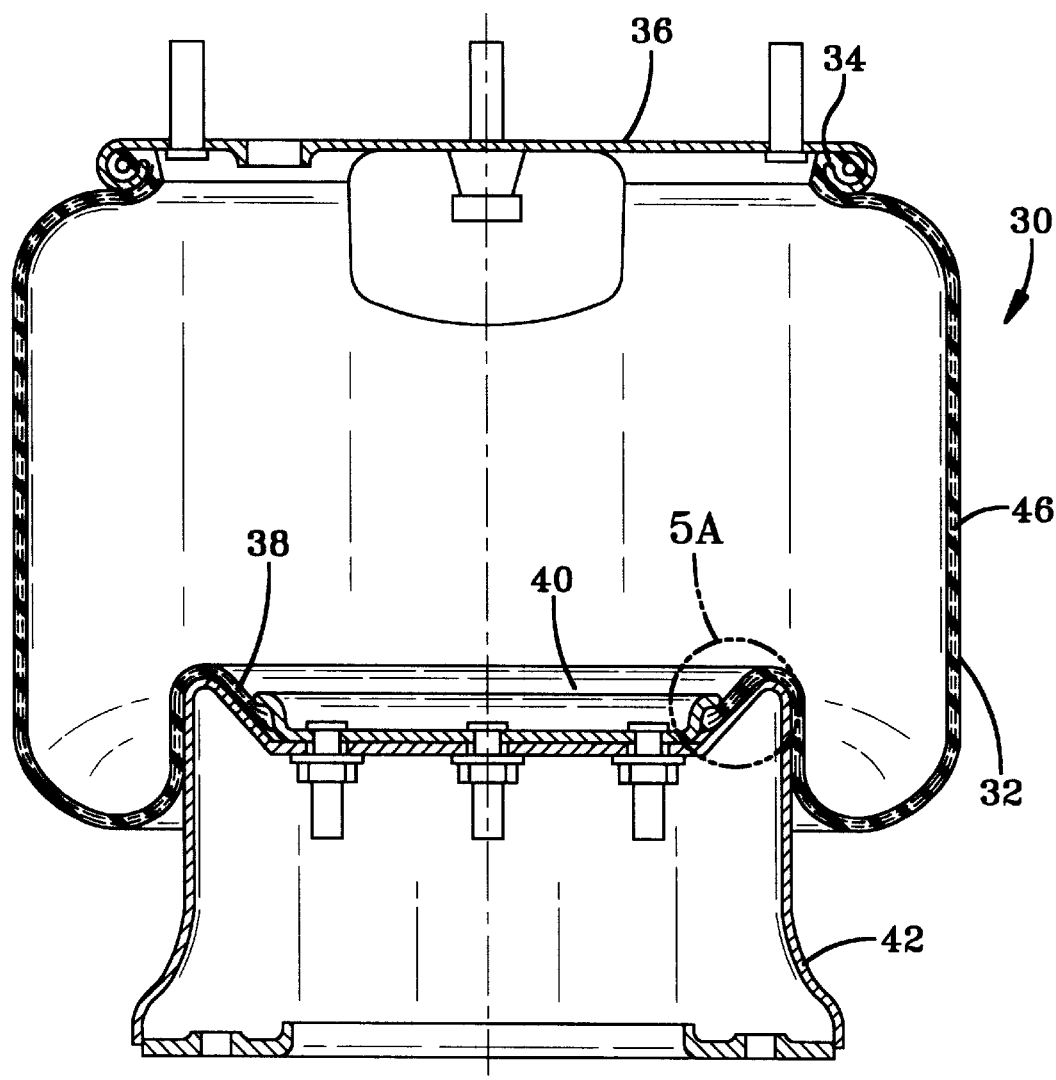
FIG. 5 illustrates an air spring.
Figure 5A:
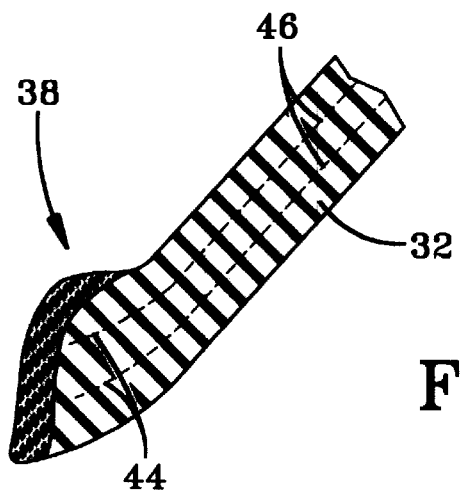
FIG. 5A illustrates the end of the air spring sleeve in accordance with the invention.
Figure 6:
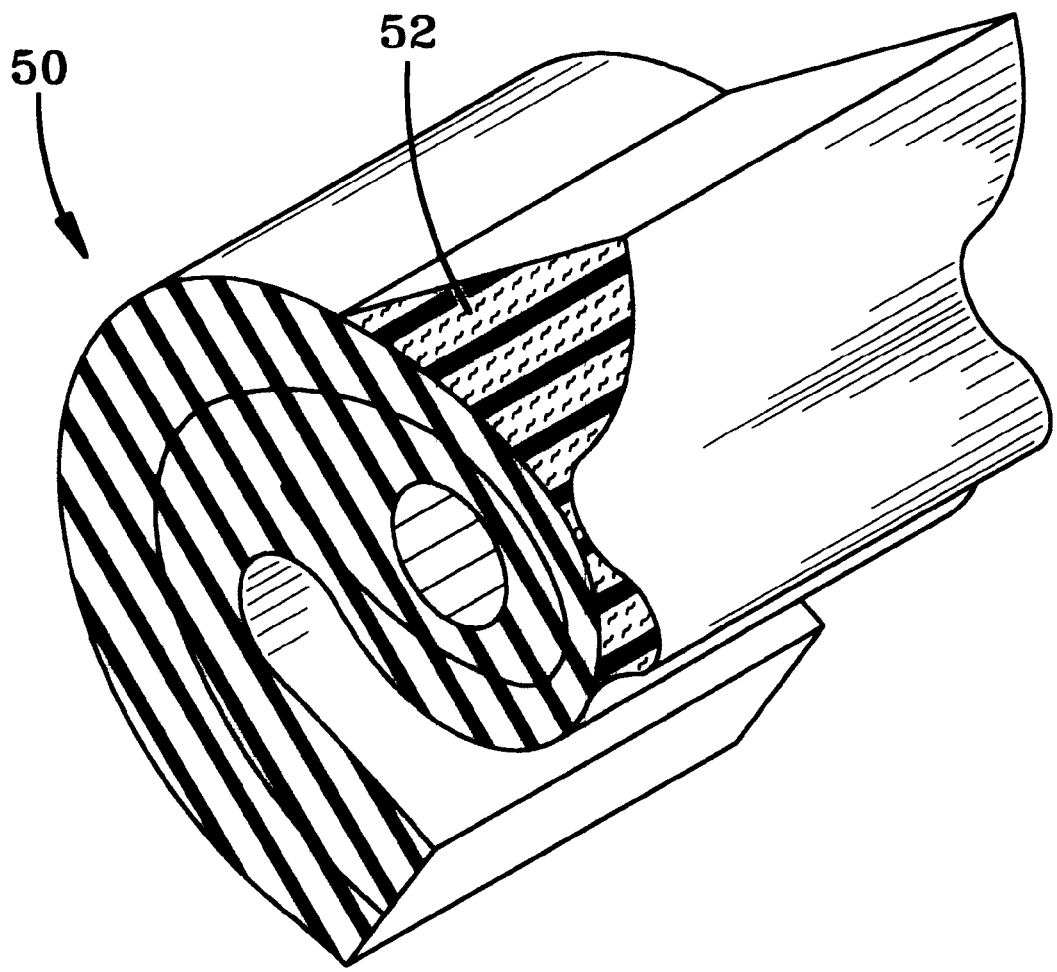
FIG. 6 illustrates another airsleeve end in accordance with the invention.

Air sleeves manufactured in accordance with the present invention are also useful in air springs 30, as illustrated in FIG. 5. The air spring air sleeve 32 is secured at one end 34 by an upper retainer 36 and the opposing end 38 is secured between a lower retainer 40 and a piston 42. Both air sleeve ends 38, 34 have a defined molded configuration. The end 38 secured between the lower retainer 40 and the piston 42 is more clearly illustrated in FIG. 5A. The sleeve end 38 has a tapered configuration and the cord ends 44 of the reinforcing plies 46 terminate short of the very end of the air sleeve end 38. The sleeve end 38 is shown with the reinforcement layer 12 being a fiber loaded elastomer 48 in accordance with the present invention, as discussed above. FIG. 6 illustrates a more complexly shaped air sleeve end 50 which may also benefit from being formed using the above disclosed inventive method. The end portion 52 is formed from a fiber loaded elastomer in accordance with the present invention. The more simply contoured sleeve ends, as illustrated in FIG. 5A, may be formed using a fabric/cord reinforcement layer; while it is better to use the fiber loaded elastomer for more complexly configured sleeve ends, as illustrated in FIG. 6, to achieve the desired configuration.

The use of a reinforcement layer at the ends of air sleeves allows the balance of the air sleeve to be constructed from high flex durability compounds, which have a greater tendency to flow during molding, while providing the needed strength and cord edge protection at the end of the air sleeve. Thus, air sleeve performance is not compromised.

What is claimed is:

1. An air sleeve, the air sleeve having a tubular shape, opposing sleeve ends, and at least one reinforcing ply extending from one sleeve end to the opposing sleeve end, the reinforcing ply comprising cords encapsulated in a ply coat compound and having at least one end of the reinforcing ply terminating in one sleeve end, the air sleeve being characterized by:

an additional reinforcing layer spaced from the end of the reinforcing ply by a distance greater than the thickness of the ply coat compound.

2. An air sleeve in accordance with claim 1, wherein both opposing air sleeve ends are provided with the additional reinforcement layer.

3. An air sleeve in accordance with claim 1, wherein the additional reinforcement layer is selected from the group consisting of fiber loaded elastomer, woven fabric ply, knitted fabric ply, spun-bonded ply, and cord reinforced ply.

4. An air sleeve in accordance with claim 1, wherein the additional reinforcement layer is a fiber loaded elastomer.

5. An air sleeve in accordance with claim 4, wherein the fiber loaded elastomer is comprised of 1.5 to 10 parts per hundred rubber of chopped fibers.

6. An air sleeve in accordance with claim 4, wherein the fibers in the fiber loaded elastomer have a nominal length of about 1/16 inch to 1/4 inch (1.5 mm to 6.5 mm).

7. A method of forming an air sleeve, the air sleeve having a tubular configuration with opposing sleeve ends, the method comprising assembling a plurality of layers to form a tubular preform and curing the tubular preform to form an air sleeve, at least one of the layers being a reinforcing ply having at least one end terminating in one sleeve end and comprising cords encapsulated in a ply coat compound, the method being characterized by:

at least one of the layers being a reinforcement layer, and assembling the plurality of layers such that the reinforcement layer is spaced from the end of the reinforcing ply by a distance greater than the ply coat compound.

8. A method of forming an air sleeve in accordance with claim 7, the method being further characterized by both opposing sleeve end being provided with the reinforcement layer.

9. A method of forming an air sleeve in accordance with claim 7 wherein the reinforcement layer is selected from the group consisting of fiber loaded elastomer, woven fabric ply, knitted fabric ply, spun-bonded ply, and cord reinforced ply.

10. A method of forming an air sleeve in accordance with claim 7 wherein the reinforcement layer is a fiber loaded elastomer.

11. A method of forming an air sleeve in accordance with claim 10, wherein the fiber loaded elastomer is comprised of 1.5 to 10 parts per hundred rubber of chopped fibers.

12. A method of forming an air sleeve in accordance with claim 10, wherein the fibers in the fiber loaded elastomer have a nominal length of about 1/16 inch to 1/4 inch (1.5 mm to 6.5 mm).

\* \* \* \* \*